Figures 1, 2:
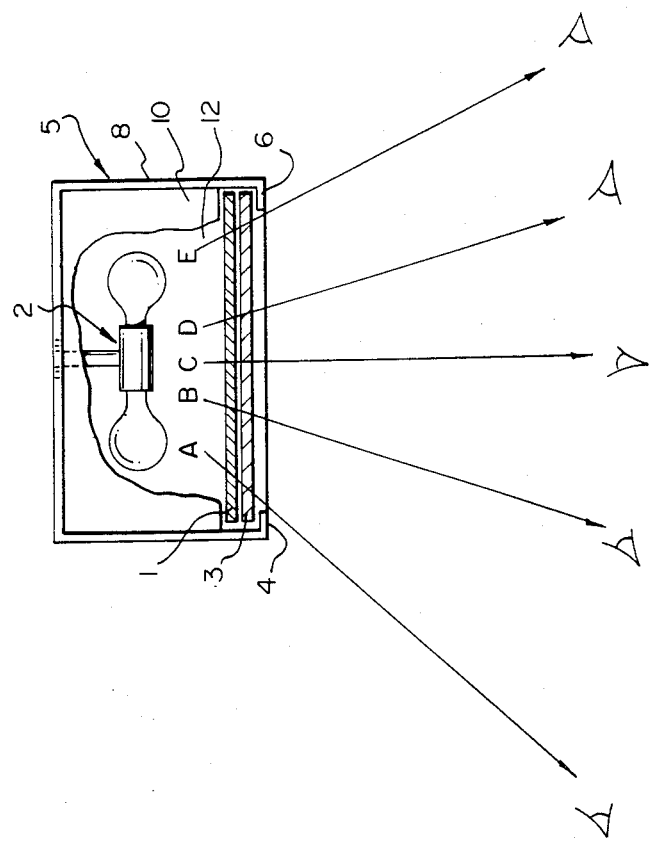

United States Patent [19]

Dobrowolski et al.

[11] Patent Number: 4,649,462
[45] Date of Patent: Mar. 10, 1987

[54] VIEWING ANGLE COLOR SENSITIVE LIGHTING ACCESSORY

[75] Inventors: Jerzy A. Dobrowolski, Ottawa; Lorne A. Whitehead, Vancouver, both of Canada

[73] Assignee: Canadian Patents and Development Limited, Ottawa, Canada

[21] Appl. No.: 786,696

[22] Filed: Oct. 11, 1985

[30] Foreign Application Priority Data

Oct. 12, 1984 [CA] Canada .................................. 465387

[51] Int. Cl.$^4$ ............................................. F21V 9/02
[52] U.S. Cl. .......................................... 362/2; 362/19; 362/343; 362/327; 362/293
[58] Field of Search ...................... 362/1, 2, 293, 343, 362/327, 308, 329, 330, 19, 235; 350/313, 316, 318

[56] References Cited

U.S. PATENT DOCUMENTS

| | | | |
|---|---|---|---|
| 3,294,964 | 12/1966 | Schwartz | 362/19 |
| 4,260,220 | 4/1981 | Whitehead | 350/102 |
| 4,556,928 | 12/1985 | Tysoe | 362/293 |

FOREIGN PATENT DOCUMENTS 944987 4/1974 Canada .

Primary Examiner—William A. Cuchlinski, Jr.
Assistant Examiner—D. M. Cox
Attorney, Agent, or Firm—Francis W. Lemon

[57] ABSTRACT

A viewing angle color sensitive lighting accessory comprising a sheet member capable of transmitting light, emitting from a visible light source, forwardly towards an area from which light is to be perceived, at least one optical interference multilayer coating on the sheet member and a reflector secured to the sheet member and extending around the light source. The coating has a transmittance which is a function of wavelength and angle of incidence, and in most instances, of state of polarization of the visible light thereto so that the light perceived from the light source has a particular coloration and, if desired, polarization at a particular viewing angle to the coating. The light source may be, for example, an incandescent light source or a light guide, or any other luminaire. The means securing the sheet member to the reflector preferably removably secures the sheet member thereto.

8 Claims, 6 Drawing Figures

VIEWING ANGLE COLOR SENSITIVE LIGHTING ACCESSORY

This invention relates to a viewing angle colour sensitive lighting accessory.

Home lighting may be used for decoration, such as, for example, lighted, coloured, ceiling, wall or floor panels. The lighting may be solely decorative or may also be provided to light an area.

Other lighting devices are provided for instructional purposes, such as, for example, lighted, coloured advertising panels or warning notices.

Whether these known types of lighting devices are for decoration or instructional purposes they can only transmit a light of a particular colouration when viewed at any angle within that of the emitted light.

There is a need for a lighting accessory which is viewing angle sensitive, that is, the light viewed emanating from the accessory is dependant upon the angle at which the accessory is viewed. Such an accessory could be used as an attractive adornment or an attention attracting instructional device.

As an example, it has already been proposed in Canadian Pat. No. 142,358, dated Aug. 13, 1912, "Lamps for Matching Colors by Artificial Light", M. Weety, to provide a light fixture with blue and green glass filters to modify the light so as to cause it to give the same effect as daylight.

It has also been proposed in Canadian Pat. No. 318,588, dated Jan. 5, 1932, "Artificial daylight lighting units", D.W. King, to provide an electric lamp with a "daylight" vari-coloured reflector or shade and a transparent screen of blue colour arranged around the lower part of the lamp, the relative disposition of the screen and shade being such that no light is given out from the lamp which is not either reflected from the shade or transmitted through the screen.

It has further been proposed in Canadian Pat. No. 238,091, dated July 6, 1920, "Artificial Illumination", G.H. Sheringham, to provide an ordinary incandescent lamp with a reflector or shade which is suitably coloured on its reflecting surface so as to act as a reflecting compensating member. An ordinary incandescent lamp usually alters the hue of such colours as violet, blue and green and the compensating member used in combination with such lamps would be coloured with two or more colours in such proportion and concentration as to absorb a suitable proportion of the excessive rays while reflecting the feeble rays present in the spectrum of the lamp light. In the case when the resultant light is partly direct and partly reflected, it is necessary in order to counterbalance as far as possible the unavoidable lack of balance in the quality of the direct light, to cause the reflected light to be compensatingly out of balance in the reverse direction. In other words the proportion and concentration of the colours on the reflector are so chosen that the reflected light has, in comparison with daylight, a greater relative proportion of the rays which are feeble in the direct light. The colours may be arranged upon the reflecting surface of the shade in suitable lines or patterns and the meeting edges of the different colours may be serrated.

Previous attempts to simulate daylight in an artificial manner have failed to do so because, under clear sky conditions, natural outdoor illumination has an important property that has been overlooked in that there is a marked variation of colour with angle. The direct rays of sunlight have a slightly yellow tint, while the illumination at peripheral angles has the characteristic blue colour of the sky. The result is that objects which are not illuminated directly by sunlight appear more blue than they otherwise would and a good example of this is that shadows on a sunny day are blue.

The fact that most people are not directly aware of this phenomenon is a result of the accommodation ability of their visual perception system. In effect, they automatically take into account the colour of ambient light when they perceive the colour of an object. Nevertheless, many people would agree that clear sky illumination with its "blue shadow" effect has a different quality than, for example, cloudy sky illumination and many find the former preferable.

At present, most artificial interior illumination systems do not incorporate a variation of colour with angle, and as a result they produce lighting similar to that of a cloudy sky.

There is a need for a lighting accessory that more realistically simulates clear sky conditions than known lighting devices in that a marked variation of colour with angle is perceived in a similar manner to clear sky conditions, and such an accessory can be provided by one which is viewing angle sensitive as previously defined herein.

In Canadian Pat. No. 944,987, dated Apr. 9, 1974, "Optical Interference Authenticating Means", K. M. Baird, J. A. Dobrowolski, P. D. Carman and A. J. Waldorf, it has been proposed in one embodiment to provide an optical interference authenticating means comprising a number of optical interference multilayer coatings each having spectral transmittance characteristics which vary with the angle of incidence of light thereon. The multilayer coatings form a covering over a transparent portion of a document to be authenticated so that the spectral transmittance characteristics may be viewed from the opposite side of the multilayer coatings, from that which the light beam impinges upon them, as a viewing angle sensitive colour change.

While the colour change effect taught by Canadian Pat. No. 944,987 has been shown to be readily observable when closely viewing the multilayer coatings covering a small, transparent area of a document to be authenticated, it could not be deduced from this that the same effect could be readily observed from the distances that, for example, overhead lighting fixtures are viewed by an observer.

According to the present invention, there is provided a viewing angle colour sensitive, lighting accessory, comprising:

(a) a sheet member for attachment to a light emitting source and capable of transmitting visible light therefrom forwardly towards an area from which transmitted light is to be perceived, and (b) at least one optical interference multilayer coating on the sheet member, the material for each layer of the multilayers being selected so that the coating has different spectral transmittance characteristics at different angles of incidence of the visible light thereto so that light thereof of a particular colouration will be perceived transmitted through the coating at at least one range of viewing angles thereto, (c) an electromagnetic radiation reflector securing the sheet member and extending rearwardly behind the sheet member and around the light emitting source, when the light source is mounted therein, so that visible lght will be reflected by the reflector forwardly towards the area from which light is to be perceived, and (d) securing means securing the sheet member to the electromagnetic radiation detector Preferably the securing means removably secures the sheet member to the electromagnetic radiation reflector.

In yet other embodiments of the present invention, each coating is of a material selected from the group consisting of cryolite, NaF, LiF, MyF$_2$, SiO$_2$, ThFu, LaF$_3$, NdF$_3$, CeF$_3$, GeO$_2$, ThO$_2$, AP$_2$O$_3$, MgO, PbF$_2$, CeO$_2$, Sb$_2$O$_3$, Bi$_2$O$_3$, HFO$_2$, La$_2$O$_3$, Sc$_2$O$_3$, Nd$_2$O$_3$, Ta$_2$O$_5$, SiN, ZrO$_2$, ZnS, TiO$_2$, Ag, Al, Au, Cu, Cr, Ge, Ni, NiCr, Si, Rh. It is conceivable that other materials with similar properties might be employed too.

The thickness of each coating is normally within one or two orders of magnitude of 0.1 μm.

Figure 5:
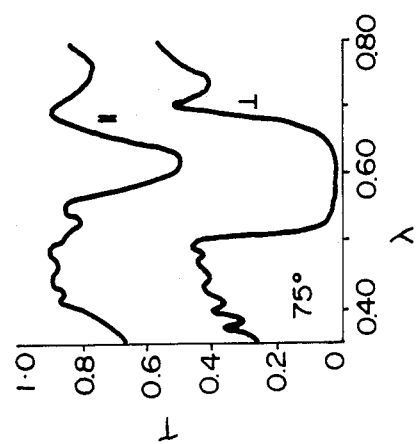
Figure 4:
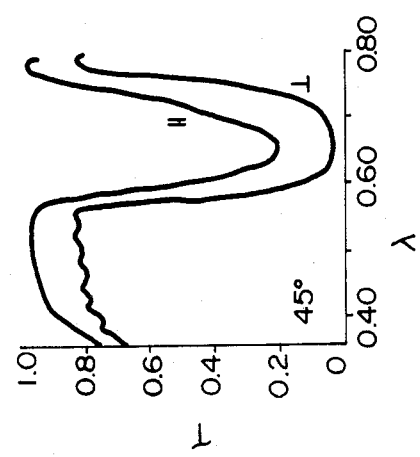
Figure 3:
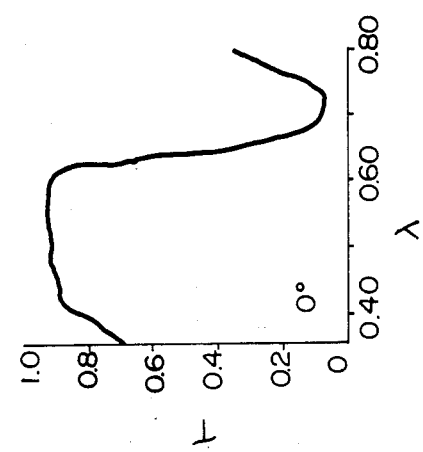
Figure 6:
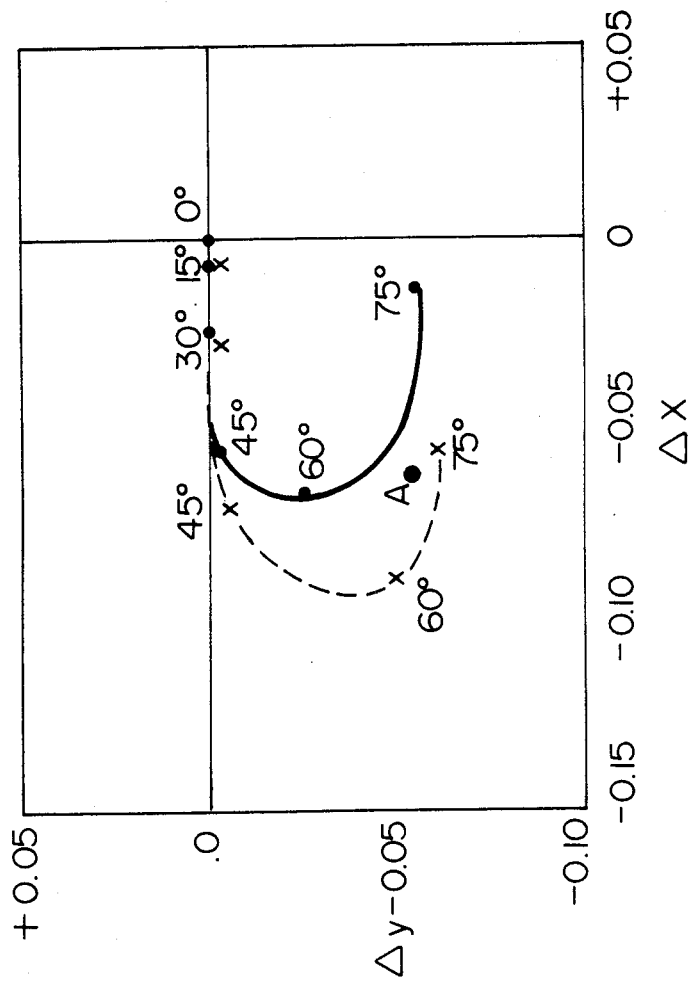

In the accompanying drawings which illustrate, by way of example, embodiments of the present invention, FIG. 1 is an end view of a viewing angle sensitive, lighting accessory using incandescent light sources with a portion of an end reflector wall removed to expose the interior, FIG. 2 is a sectional end view of a different, viewing angle sensitive, lighting accessory to that shown in FIG. 1, using a prism light guide as a light source, FIGS. 3 to 5 are graphs showing the calculated spectral transmittance values of an optical interference multilayer coating for light incident thereon at angles of 0°, 45° and 75° respectively, and FIG. 6 depicts calculated and measured CIE chromaticity coordinate differences between normal transmittance angle and various other transmittance angles, for a Prism Light Guide luminaire provided with an optical interference multilayer coating on its emitting surface.

In FIG. 1 there is shown a viewing angle sensitive, lighting accessory, comprising:

(a) a sheet member 1 for attachment to a light emitting source 2 and capable of transmitting visible light therefrom forwardly in the directions of arrows A to D towards an area from which light is to be perceived, (b) at least one optical interference multilayer coating 3 on the sheet member 1, the material and thickness for each layer of the multilayer being selected so that the coating has different spectral reflectance and spectral transmittance characteristics and, if desired, states of polarization at different angles of incidence of the visible light thereto so that light of a particular colouration and, if desired, polarization will be perceived transmitted through the coating at at least one range of viewing angles thereto, (c) an electromagnetic radiation reflector, generally designated 5, securing the sheet member 1 and extending rearwardly behind the sheet member 1 and around the light emitting source 2, when the light source 2 is mounted therein, so that visible light will be reflected by the reflector 5 forwardly towards the area from which light is to be preceived, and (d) securing means, in the form of flanges 4 and 6 securing the sheet member 1 to the electromagnetic radiation reflector 5.

The light emitting source 2 is an incandescent light fixture.

The electromagnetic radiation reflector, 5 has a highly reflective interior and comprises an inverted U-shaped casing 8 which extends rearwardly behind the sheet member 1 so that the electromagnetic radiation will be reflected by the reflector 5 forwardly towards the area from which light is to be perceived. The flanges 4 and 6 are attached to the sides of the inverted U-shaped casing 8 and extend inwardly therefrom. The reflector 5 has end walls 10 and 12. The light emitting source 2 is mounted in the reflector 5. The sheet member 1, with the multilayer coating 3 thereon, is secured on the flanges 4 and 6 by being slid on them beneath the end wall 10 until the sheet member 1 butts against the end wall 12. Thus the sheet member 1 is removably secured to the light emitting source 2.

In operation, the light perceived from the accessory along the viewing angle of arrow A will be of a particular colouration changing to a different colouration along the viewing angle of arrow B to yet another colouration along the viewing angle C and back again through the same colourations along the viewing angles D and E. How this is achieved will be described later.

The materials for the optical interference coatings are selected so that the multilayer coating 3 has the property that the significant fraction of the electromagnetic radiation which is not transmitted through it is reflected back towards the highly reflective interior of the reflector 5 to be reflected back therefrom so that it has another opportunity to be transmitted through the multilayer coating.

In FIG. 2, similar parts to those shown in FIG. 1 are given the same reference numerals and the previous description is relied upon to describe them.

In FIG. 2, a light emitting source 14 is provided comprising a light guide of the type described and claimed in U.S. Pat. No. 4,260,220, dated Apr. 7, 1981, "Prism Light Guide Having Surfaces which are in Octature", L. A. Whitehead. The light guide comprises a longitudinal, hollow structure made of transparent or translucent material, e.g. acrylic plastic or optically clear glass, and has planar inner and outer surfaces which are in "octature". An inverted U-shaped outer, protective casing 16 is provided having flanges 18 and 20 securing the sheet member 1 with the multilayer coating 3 thereon in the same manner as the flanges 4 and 6 in FIG. 1.

The light that is provided at one or both ends of the light guide may, for example, be a reflected beam of sunlight by day, when available, and an artificial beam of light at other times. In some embodiments sunlight, when available, may be reflected into one end of the light guide and artificial light beamed in the other end thereof at other times.

The lighting device shown in FIG. 2 functions in the same manner as the lighting device shown in FIG. 1.

Under typical clear sky conditions, at mid-latitude and mid-day, typical CIE chromaticity coordinates for the light coming directly from the sun are (0.335, 0.340). In comparison, typical coordinates of the blue sky are (0.275, 0.285).

The following is an example of artifically simulating this chromaticity difference:

If a reflected beam of sunlight is directed along the light guide shown in FIG. 2, then the simulation of clear sky daylight illumination is achieved by the coatings of the optical interference multilayer coating 3 being chosen so as to act as a long wavelength cut-off filter whose normal transition wavelength is just outside the visible spectral range, and which shifts towards shorter wavelengths with a more acute viewing angle of incidence to the optical interference multilayer coating 3. The design parameters for one such an optical interference multilayer coating 3 are set out below. Many other designs with similar performance could be produced by known techniques.

The transmittance T and reflectance R of a nonabsorbing optical interference multilayer coating 3 consisting of N layers can be expressed in terms of the refractive indices $n_o$, $n_s$ of the incident and substrate media and of the elements of the product matrix M given by $$M = M_1 M_2 \ldots M_j \ldots M_n, \quad (1)$$

Here $$M_j = \begin{bmatrix} \cos\delta_j & \dfrac{i}{u_j}\sin\delta_j \\ iu_j\sin\delta & \cos\delta_j \end{bmatrix} ; i = \sqrt{-1} \quad (2)$$

For a film at non-normal angle of incidence $\delta_j$ and $u_j$ are the effective optical phase thickness and effective refractive index, given by $$\delta_j = \frac{2\pi}{\lambda} n_j t_j \cos\Phi_j \quad (3)$$

and $$u_j = n_j \cos\Phi_j (\parallel) \quad (4)$$
$$= n_j / \cos\Phi_m (\perp)$$

The angle 101 $_j$ is the angle of refraction within the j-th film. It is related to the angle of incidence $\Theta$ by Snell's law:

$$n_o \sin\Phi = n_j \sin\Phi_j \quad (5)$$

where $n_j$ is the refractive index of the j-th layer.

It follows from (3) that with increasing angle of incidence the effective phase thicknesses of the layers get smaller, and therefore the spectral features of the multilayer are displaced towards shorter wavelengths. The effective indices get smaller or larger, for radiation polarized parallel or perpendicular, respectively, to the plane of incidence (4). At larger angles this results in marked polarization splitting and a distortion of the normal incidence spectral features. But the human eye does not distinguish light of different polarizations and perceives only the average of the two components, $\frac{1}{2}(T\parallel + T\perp)$ or $\frac{1}{2}(R\parallel + R\perp)$. These are therefore the quantities that have to be optimized in the design process.

Empirical results with many different all-dielectric optical interference multilayer coatings 3 has show that, at least for smaller angles of incidence (73 <30°), the shift of the coarse spectral features is proportional to $\cos\overline{\Phi}$, where $\overline{\Phi}$ is given by $$\overline{\phi} = \sin^{-1}\left(\frac{\sin\theta}{\overline{n}}\right) \quad (6)$$

where the average refractive index $\overline{n}$ of the optical interference multilayer coating 3 is defined as follows:

$$\overline{n} = \sum_{j=1}^{N}(n_j t_j) / \sum_{j=1}^{N}(t_j) \quad (7)$$

It will be seen from (6) that $\overline{n}$ will determine the rate at which the coarse spectral features will shift with angle. There will be thus an optimal value for $\overline{n}$. Even within this constraint there are many different ways of designing a long wavelength cut-off filter. However, it is desirable that the resulting optical interference multilayer coating 3 be rugged and be as economical to produce as possible. It is a well-known fact that low transmissions in the rejection region are achieved with the least number of optically non-absorbing coatings with quarter-wave stacks composed of two materials with refractive indices whose ratio is as high as possible. It was therefore decided to use quarter-wave stacks as a starting point in an automatic thin film synthesis program. $SiO_2$ is the hard coating material with the lowest refractive index (1.45), and a suitable high refractive index material is $ZrO_2$, which yields an acceptable refractive index ratio and mean refractive index. Unfortunately, with this pair of materials at high angles of incidence a transmission band appears in the red part of the spectrum. Should this be undesirable, a more complicated optical interference multilayer coating 3 can be designed.

The above approach was used to numerically design several optical interference multilayer coatings 3. The results given below are for a fifteen-layer system whose construction parameters are given in the following table.

As can be seen, the polarization of the transmitted light increases strongly with the angle of viewing. At larger angles the transmittance for light polarized parallel to the plane of viewing is significantly larger than that for light polarized perpendicular to that plane. When the surface is mounted horizontally, this result serves to simulate the polarization characteristics of natural sky light in which peripheral rays are substantially polarized.

| CONSTRUCTION PARAMETERS OF THE OPTICAL INTERFERENCE MULTILAYER COATING | | |
|---|---|---|
| NUMBER SUBSTRATE | METRIC THICKNESS 0.100 mm | MATERIAL NAME POLYESTER FILM |
| 1 | 0.0117 μm | $ZrO_2$ |
| 2 | 0.1618 | $SiO_2$ |
| 3 | 0.1003 | $ZrO_2$ |
| 4 | 0.1303 | $SiO_2$ |
| 5 | 0.0921 | $ZrO_2$ |
| 6 | 0.1289 | $SiO_2$ |
| 7 | 0.0895 | $ZrO_2$ |
| LAYERS  8 | 0.1288 | $SiO_2$ |
| 9 | 0.0888 | $ZrO_2$ |
| 10 | 0.1288 | $SiO_2$ |
| 11 | 0.0902 | $ZrO_2$ |
| 12 | 0.1300 | $SiO_2$ |
| 13 | 0.1035 | $ZrO_2$ |
| 14 | 0.2099 | $SiO_2$ |
| 15 | 0.0081 | $ZrO_2$ |
| MEDIUM | | AIR |

The calculated spectrac transmittance of this optical interference multilayer coating at 0°, 45°, and 75° incidence are given in FIGS. 3 to 5 respectively, where T is the transmittance and λ is the wavelength in μm. In these figures, ∥ designates light polarized parallel to the plane of incidence, and ⊥ designates light polarized perpendicular to the plane of incidence.

The corresponding calculated CIE coordinate differences Δx, Δy between normal incidence transmittance and transmittance at other angles are plotted in a dashed line in FIG. 6. A source C illumination was assumed in the calculations.

The coatings were deposited onto a 0.004" thick polyester film substrate in a high vacuum box coater. An electron beam gun was used to deposit the coatings. The most sensitive wavelength method was used to monitor the deposition process. The measured normal incidence spectral transmittance of the resulting multilayer corresponded to those shown in FIG. 3.

The coated polyester film was mounted on a short section of a light guide of the type shown in FIG. 2, and a portable colourimeter made by Minolta was used to measure the colour of the transmitted radiation. The results are shown by continuous line in FIG. 6. There is a discrepancy between the calculated and measured colour differences, which is believed to be caused by the fact that the spectral energy distribution of the light incident on the polyester film was subtly different than the theoretical source C used for the calculation. Nevertheless, there is qualitative agreement between theory and experiment. The CIE coordinates of the same light guide, but without the angle sensitive lighting accessory, were measured and were found to be substantially independent of angle, as expected. These results show a performance that is a significant step towards simulating the difference in colour between blue sky and direct sunlight, which is also depicted (point A) in FIG. 6.

The experimental design demonstrated that it is possible to simulate clear sky illumination with direct sunlight which is, for example, channelled through a light guide of the type shown in FIG. 2, and a specially designed viewing angle sensitive, optical interference multilayer coating. The same design criteria can be applied to viewing angle sensitive, light accessories based on artificial light sources. For example, it is a relatively easy matter in addition to modify the normal incidence transmittance of the multilayer coating to adjust the light emissions of incandescent sources to clear sky daylight illumination.

For the techniques described in this paper to be practical, equipment must exist for the accurate mass production of such complicated multilayer structures at low per-unit area cost. Work on such facilities is well advanced at several places.

Lighting fixtures according to the present invention may be used for decorative effects, instructional purposes, or for a source of illumination in addition to the decorative effects or instructional purposes.

Light fixtures according to the present invention may be used overhead, laterally spaced from or at a lower level than the observer. It is clear that for these applications many different angle sensitive, lighting accessories can be designed and constructed with other, interesting colour changes of the perceived light.

In some embodiments of the present invention the optical interference multilayer coating is angle sensitive with respect to polarization. It will be understood that in order for the change in polarization with angle to be observed, it is necessary for the light from the accessory to be viewed with the aid of a light polarizing device.

The coatings of the multilayer coating 3 may be made of non-absorbing materials such as, for example, cryolite, NaF, LiF, MyF$_2$, SiO$_2$, ThFu, LaF$_3$, NdF$_3$, CeF$_3$, GeO$_2$, ThO$_2$, Al$_2$O$_3$, MgO, PbF$_2$, CeO$_2$, Sb$_2$O$_3$, HfO$_2$, Bi$_2$O$_3$, La$_2$O$_3$, Sc$_2$O$_3$, Nd$_2$O$_3$, Ta$_2$O$_5$, SiN, ZrO$_2$, ZnS, TiO$_2$, Ag, Al, Au, Cu, Cr, Ge, Ni, NiCo, Si, Rh, or any other materials that form satisfactory layers or coatings.

The thicknesses of the coatings will normally be within one or two orders of magnitude of 0.1 $\mu$m.

It will be appreciated that it is within the scope of the present invention for:
 (i) the light source to be in the form of a light guide
 (ii) the colour sensitive light accessory to cause a variation of colour with angle which substantially simulates the variation found with clear sky illumination, and
 (iii) the accessory to substantially simulate the variation of polarization with angle found with clear sky illumination.

We claim:
1. A viewing angle colour sensitive, lighting accessory, comprising:
   (a) a sheet member for attachment to a light emitting source and capable of transmitting visible light therefrom fowardly towards an area from which transmitted light is to be perceived, and
   (b) at least one optical interference multilayer coating on the sheet member, the material and thickness for each layer of the multilayers being selected so that the coating has different spectral transmittance characteristics at different angles of incidence of the visible light thereto so that light thereof of a particular colouration will be perceived transmitted through the coating at at least one range of viewing angles thereto,
   (c) an electromagnetic radiation reflector securing the sheet member and extending rearwardly behind the sheet member and around the light emitting source, when the light source is mounted therein, so that visible light will be reflected by the reflector forwardly towards the area from which light is to be perceived, and
   (d) securing means securing the sheet member to the electromagnetic radiation reflector.

2. An accessory according to claim 1, wherein the securing means removably secures the sheet member to the electromagnetic radiation reflector.

3. An accessory according to claim 1 or 2, wherein an electromagnetic radiation reflector is provided securing the sheet member and extending rearwardly therebehind and around the light emitting source, which is mounted therein, so that visible light will be reflected by the reflector forwardly towards the area from which light is to be perceived.

4. An accessory according to claim 1, wherein the light source is a light guide.

5. An accessory according to claim 3 or claim 4, wherein the colour sensitive light accesory causes a variation of colour with angle which substantially simulates the variation found with clear sky illumination.

6. An accessory according to claim 5, wherein the accessory also substantially simulates the variation of polarization with angle which is found with clear sky illumination.

7. An accessory according to claim 1, wherein each coating is of a material selected from the group consisting of cryolite, NaF, LiF, MyF$_2$, SiO$_2$, ThFu, laF$_3$, NdF$_3$, CeF$_3$, GeO$_2$, ThO$_2$, Al$_2$O$_3$, MgO, PbF$_2$, CeO$_2$, Sb$_2$O$_3$, HfO$_2$, Bi$_2$O$_3$, La$_2$O$_3$, Sc$_2$O$_3$, Nd$_2$O$_3$, Ta$_2$O$_5$, SiN, ZrO$_2$, ZnS, TiO$_2$, Ag, Al, Au, Cu, Cr, Ge, NiCr, Si, and Rh.

8. An accessory according to claim 7, wherein the thickness of each coatings is within one or two orders of magnitude of 0.1 $\mu$m.

* * * * *